United States Patent [19]

Clark

[11] 3,800,613
[45] Apr. 2, 1974

[54] VARIABLE SPEED SPROCKET DRIVE
[76] Inventor: Marion A. Clark, 546 W. Pleasant, Tulare, Calif. 93274
[22] Filed: Mar. 29, 1973
[21] Appl. No.: 345,986

[52] U.S. Cl. ................................................. 74/244
[51] Int. Cl. ............................................. F16h 55/30
[58] Field of Search ........................... 74/244, 230.2

[56] References Cited
UNITED STATES PATENTS
2,584,447   2/1952   Hayot .................................. 74/244
FOREIGN PATENTS OR APPLICATIONS
447,879   3/1949   Italy ..................................... 74/244
357,867   3/1938   Italy ..................................... 74/244

*Primary Examiner*—Samuel Scott
*Assistant Examiner*—Allan Russell Burke
*Attorney, Agent, or Firm*—Brown & Martin

[57] ABSTRACT

A variable speed sprocket drive utilizing multiple small coplanar sprockets mounted on hinged arms on a common shaft, with means for moving the arms radially in unison to vary the effective diameter of the sprocket group. Each sprocket has a clutch shoe which is frictionally engageable with a common clutch plate on a drive shaft. Control means is provided for rapid adjustment of the sprockets and for engaging and disengaging the clutch. A chain passes around the sprockets for coupling to mechanism to be driven, the structure being particularly adaptable to a bicycle, or other apparatus requiring a low speed variable drive.

9 Claims, 3 Drawing Figures

VARIABLE SPEED SPROCKET DRIVE

BACKGROUND OF THE INVENTION

Variable speed drives are generally of two basic types, geared and frictional coupling. Frictional types tend to slip under heavy load, are often bulky and require precise construction. Gear types with multiple gears of different sizes are also bulky, have complex means for shifting between gears, and are limited to specific ratios set by the gears.

SUMMARY OF THE INVENTION

The sprocket drive described herein provides continuously variable speed control over its useful range, with positive chain and sprocket drive engagement at all settings. Multiple small coplanar sprockets are mounted on individual arms which swing radially from a common shaft, the groupled sprockets supporting a drive chain in the manner of a single large sprocket. Speed adjustment means operable by a single control moves the arms in unison to vary the effective diameter of the composite sprockets. Each sprocket carries a clutch shoe for engagement with a common clutch plate, which is fixed on a drive shaft concentric with the sprocket shaft. A simple control, adjacent the speed control, allows rapid de-clutching for speed change, and immediate engagement of the clutch to resume the drive.

While the mechanism can be used for various purposes, it is particularly adaptable to a bicycle, using the conventional chain drive. A simple spring loaded idler will accommodate changes in the effective chain length during speed changes.

The primary object of this invention, therefore, is to provide a new and improved variable speed sprocket drive.

Another object of this invention is to provide a new and improved variable speed sprocket drive having multiple small sprockets forming a composite sprocket with variable effective diameter.

Another object of this invention is to provide a new and improved variable speed sprocket having easily operable adjustment and clutch means to facilitate rapid speed changes.

A further object of this invention is to provide a new and improved variable speed sprocket which is particularly adaptable to a bicycle or similar chain drive mechanism.

Other objects and many advantages of this invention will become more apparent upon a reading of the following detailed specification and in viewing the drawings wherein like reference numerals designate like parts throughout and in which.

DESCRIPTION OF THE PREFERRED EMBODIMENT

Figures 1, 2, 3:
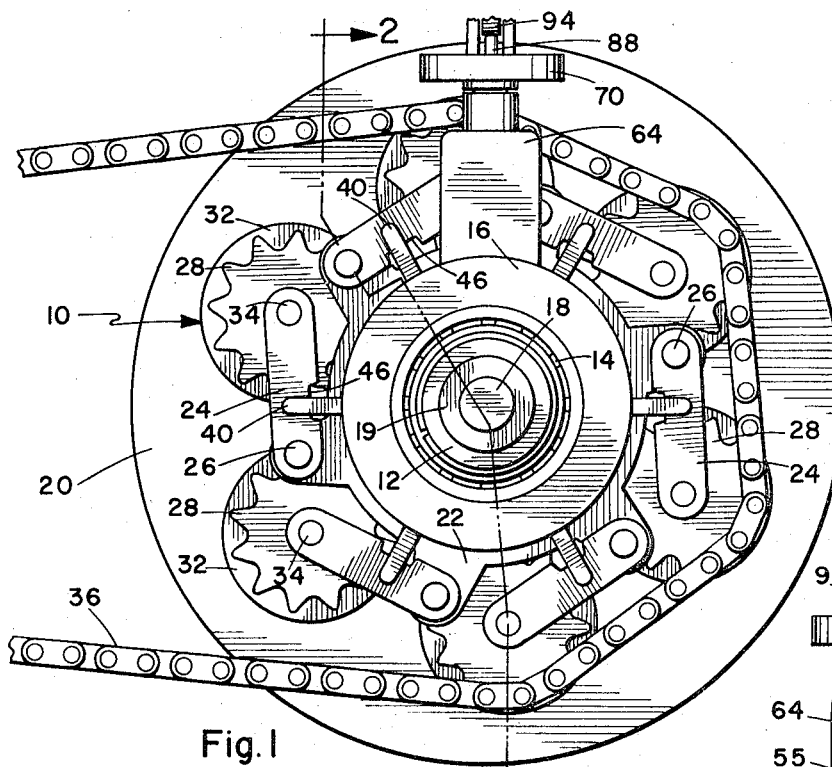
FIG. 1 is a side elevation view of the sprocket assembly.
FIG. 2 is a sectional view taken on line 2—2 of FIG. 1.
FIG. 3 is a sectional view taken on line 3—3 of FIG. 2.

The mechanism comprises a sprocket assembly 10 mounted on a tubular sprocket shaft 12, which is journalled in bearings 14 in a hub or housing 16 and extends beyond the housing at one end. Concentric with sprocket shaft 12 is a drive shaft 18, axially slidably mounted in bearings 19, the drive shaft carrying a clutch plate 20 having a diameter at least equal to the maximum effective diameter of the sprocket. In a bicycle, the housing 16 would take the place of the usual pedal bearing hub, and pedals would be mounted on drive shaft 18. However, the mechanism is not limited to use on a bicycle.

The sprocket assembly 10 includes a mounting disc 22 carrying a plurality of arms 24, each pivoted at one end to swing radially on a hinge pin 26. Rotatably mounted on the other end of each arm 24 is a sprocket 28, each arm being biased to swing inwardly by a spring 30 at the hinge pin 26. Fixed to each sprocket 28 is a circular clutch shoe 32, the sprocket and clutch shoe being freely rotatable on a shaft 34 secured to the respective arm 24. Six sprockets are illustrated as an example, but any convenient number may be used, and other suitable spring arrangements may be installed to bias the sprocket assembly to minimum diameter. The sprockets 28 are all coplanar and form a large composite sprocket for engagement by a chain 36, which extends around and is supported by at least half of the individual sprockets. On a bicycle the chain would extend to the usual rear wheel sprocket, and slack in the chain due to variations in the size of the sprocket assembly would be taken up by a spring loaded idler, not shown, as used in a derailleur type drive.

Slidably mounted on drive shaft 18 is a sleeve 38, from which posts 40 extend radially outwardly through longitudinal slots 42 in the extended end of sprocket shaft 12. At the outer end of each post 40 is an inclined ramp 44 which engages a notch 46 in the inner edge of one of the arms 24. Ramps 44 taper conically to the axis of the shaft assembly so that, by moving the posts 40 toward the sprocket assembly, arms 24 are forced outwardly by the inclined ramps. Sleeve 38 also has stub posts 48 projecting radially through slots 50 in the sprocket shaft 12, inside housing 16. Stub posts 48 support a ring bearing 52 concentric with the shaft axis, the ring bearing having an outer collar 54. Pivotally mounted on a hinge pin 55 in housing 10 is a yoke 56, which straddles ring bearing 52 and is connected to diametrically opposed actuating pins 58 on collar 54. Fixed to yoke 56 is an arm 60 having a threaded nut 62 pivotally attached to the end remote from the yoke.

Housing 16 has an extended portion 64 in which is mounted a tubular stem 66, radial to the shaft axis, the stem having a threaded portion 68 which is threaded through nut 62. Rotation of stem 66, by means of a large knob 70 on its outer end, causes nut 62 to be moved along threaded portion 68 and swing the yoke 56 about its pivot. This produces a sliding action of sleeve 38 and moves ramps 44 against arms 24 to shift sprockets 28 radially. As illustrated, counterclockwise rotation of knob 70 will enlarge the effective diameter of the composite sprocket. When knob 70 is turned clockwise, the ramp 44 will be retracted and springs 30 will pull arms 24 in to reduce the sprocket diameter.

To operate the clutch mechanism, drive shaft 18 has a cross bar 72 extending through slots 74 in sprocket shaft 12, to carry a ring bearing 76. Surrounding ring bearing 76 is a collar 78 having diametrically opposed pins 80, which are engaged by a yoke 82 pivotally mounted in housing 16 on a hinge pin 84. Fixed to yoke 82 is an arm 86 which extends below the lower end of stem 66. Slidably mounted in stem 66 is a push rod 88 which rests on arm 86, the upper end of the push rod projecting above knob 70. On top of the knob is a fork 90, in which a lever 92 is pivotally held, the lever having an eccentric cam 94 which engages the upper end of push rod 88. In the full line position in FIG. 2, lever 92 is raised and clutch plate 20 is clear of the clutch shoes 32. A spring 96 between clutch plate 20 and bearing 19 ensures release of the clutch. To engage the clutch the lever 92 is pushed down, which forces push rod 88 down against the arm 86. This swings yoke 82 and pulls the drive shaft 18 to seat clutch plate 20 against the clutch shoes 32, so locking the sprockets 28 against rotation. The drive shaft 18, sprocker assembly 10, posts 40 and sleeve 38 are thus locked together to rotate as a unit. It should be noted that cross bar 72 provides a driving connection between drive shaft 18 and sprocket shaft 12, the clutch mechanism being used only to lock the individual sprockets against rotation.

To change the drive ratio, lever 92 is lifted to release the clutch, knob 70 is rotated to adjust the sprocket assembly to a larger or smaller effective diameter as desired, and the clutch is re-engaged by depressing lever 92. On a bicycle the knob and clutch lever could be spaced above the housing to be readily accessible to the rider. With the clutch released, sprockets 28 are free to rotate, allowing the chain to roll around the sprockets with a freewheeling action while a speed change is being made.

Having described my invention, I claim:

1. A variable speed sprocket drive, comprising:
   a housing having a sprocket shaft rotatably mounted therein, with one end projecting from the housing;
   a sprocket assembly on said one end, including a plurality of radially movable pivoted arms, each of said arms having a sprocket rotatably mounted thereon;
   each of said sprockets having a clutch shoe fixed thereto, and said clutch shoes being coplanar;
   a drive shaft coaxially slidably mounted in said sprocket shaft;
   a clutch plate fixed on said drive shaft confronting said clutch shoes;
   clutch actuating means coupled to said clutch plate for selective engagement with the clutch shoes;
   speed control means coupled to said arms for moving the arms collectively and thus varying the effective diameter of the composite sprocket formed by the sprockets;
   and a drive chain extending around and supported by several of said sprockets.

2. A variable speed sprocket drive according to claim 1, wherein said clutch actuating means includes a yoke pivotally mounted in said housing, straddling said drive shaft and pivotally connected thereto;
   and control means externally of the housing for shifting said yoke.

3. A variable speed sprocket drive according to claim 1, wherein said speed control means includes a sleeve axially slidable on said drive shaft, a plurality of posts extending from said sleeve to each of said arms, each post having an inclined ramp face engaging the respective arm;
   and means for moving said sleeve axially.

4. A variable speed sprocket drive according to claim 3, wherein said ramp faces engage the inner portions of said arms, the arms being spring biased inwardly against the ramp faces.

5. A varible speed sprocket drive according to claim 3, wherein said last mentioned means includes a yoke pivotally mounted in said housing, straddling said sprocket shaft and pivotally connected thereto;
   and control means externally of said housing connected to said yoke.

6. A variable speed sprocket drive according to claim 5, wherein said last mentioned control means comprises a threaded nut carried by said yoke, a stem rotatably mounted in said housing and having a threaded portion in threaded engagement with said nut, and a control knob fixed to said stem.

7. A variable speed sprocket drive according to claim 6, wherein said clutch actuating means comprises a second yoke pivotally mounted in said housing, straddling said drive shaft and pivotally connected thereto, said yoke having an arm extending therefrom;
   a push rod axially slidable in said stem and engaging said arm;
   and means for moving said push rod to swing said yoke for selective engagement of the clutch means.

8. A variable speed sprocket drive according to claim 7, wherein said last mentioned means comprises a lever pivotally mounted on said knob, said push rod projecting through the knob, and said lever having a cam portion engaging said push rod.

9. A variable speed sprocket drive according to claim 8, wherein said drive shaft has a cross bar fixed therein and extending outwardly through said sprocket shaft for driving connection therewith;
   a ring bearing secured to said cross bar;
   said second yoke being connected to said ring bearing.

* * * * *